May 21, 1968 — L. J. OLSON ETAL — 3,383,841
FLUID FILTER

Filed Feb. 21, 1966 — 2 Sheets-Sheet 1

INVENTORS
LAWRENCE J. OLSON
ERLAND D. ANDERSON
DONALD D. GRONHOLZ
BY Merchant & Gould
ATTORNEYS May 21, 1968 L. J. OLSON ETAL 3,383,841
FLUID FILTER
Filed Feb. 21, 1966 2 Sheets-Sheet 2
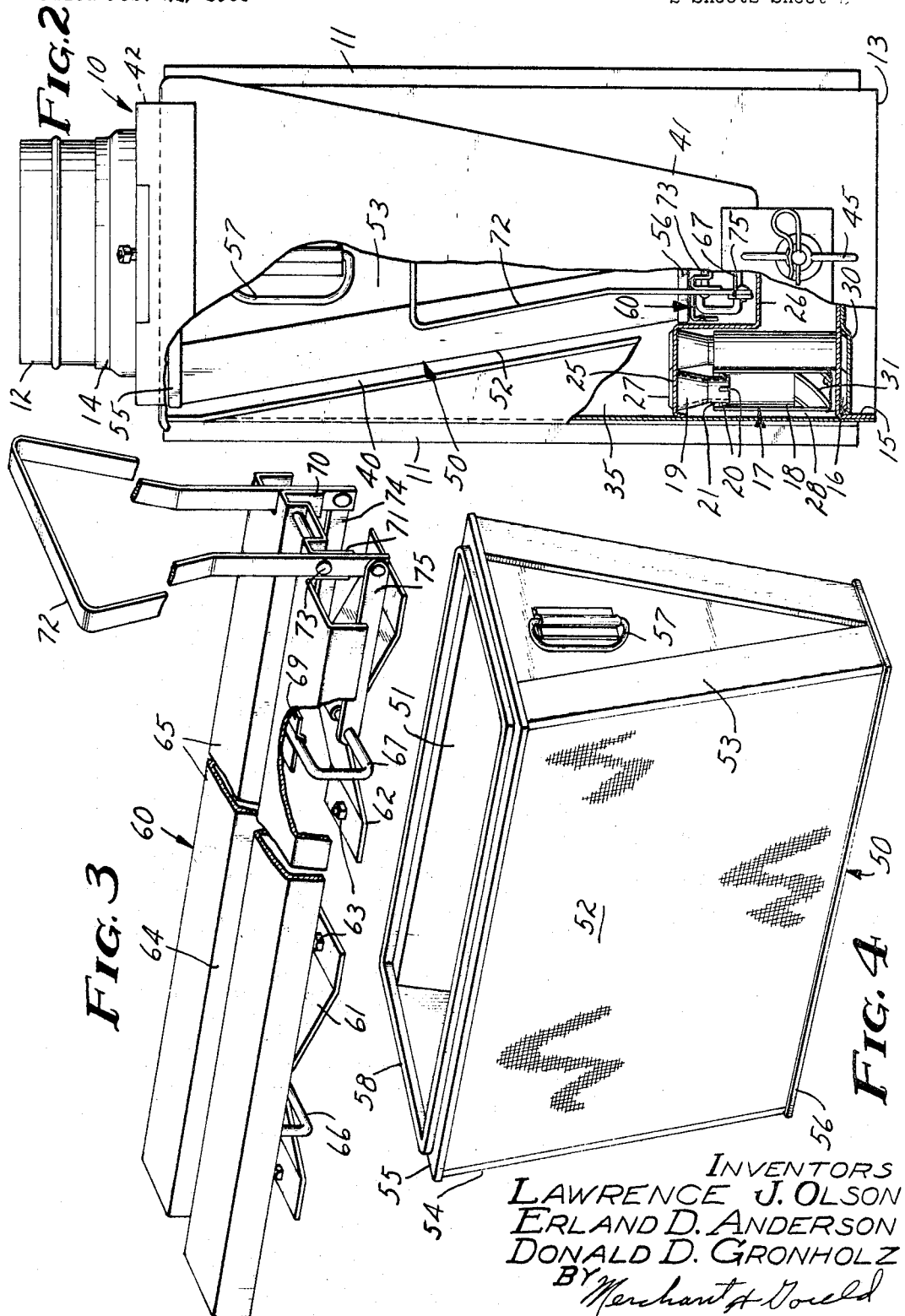
INVENTORS
LAWRENCE J. OLSON
ERLAND D. ANDERSON
DONALD D. GRONHOLZ
BY Merchant & Gould
ATTORNEYS

United States Patent Office 3,383,841
Patented May 21, 1968

3,383,841
FLUID FILTER
Lawrence J. Olson, St. Paul, and Erland D. Anderson and Donald D. Gronholz, Minneapolis, Minn., assignors to Donaldson Company Inc., Minneapolis, Minn., a corporation of Delaware
Filed Feb. 21, 1966, Ser. No. 528,942
4 Claims. (Cl. 55—337)

ABSTRACT OF THE DISCLOSURE

A fluid filter including a fluid permeable V-shaped filter element and a plurality of centrifugal filter elements mounted in two groups, one at either side of the apex of the fluid permeable filter element, and retaining means mounted therebetween for retaining the fluid permeable filter element tightly against an outlet opening in a housing surrounding the entire structure. The fluid to be filtered flowing inwardly through one end of the housing, the centrifugal filter elements, at least partially fluid permeable tapering sides of the fluid permeable filter element and outwardly through an outlet in the housing. The housing further having a generally V-shaped opening therein compatible with the V-shaped fluid permeable filter element for insertion and removal of said filter element.

---

This invention pertains to an improved fluid filter and more specifically to a novel structure and retaining means for a fluid filter which greatly increases the efficient utilization of space and the operation thereof.

The present filter is the type which includes centrifugal filter elements that remove 90 to 95% of the foreign objects in the fluid and a permeable filter element which removes substantially all of the remaining foreign material. In filters of this type the permeable element generally has a particular position with respect to the housing and the operator must be careful to place the element in the housing correctly. In filters of this type size has always been a problem since the fluid must flow through the centrifugal filter element and the permeable filter element with a minimum deviation to maintain the desired amount of flow. Also, it is important that the permeable element be easily and quickly changeable and that it be firmly locked into position during operation with no leakage therearound.

It is an object of the present invention to provide a new and improved fluid filter.

It is a further object of the present invention to provide a fluid filter which is compact and highly efficient.

It is a further object of the present invention to provide a filter having retaining means which easily and firmly lock the permeable filter in operating position.

These and other objects of this invention will become apparent to those skilled in the art upon consideration of the accompanying specification, claims, and drawings.

Referring to the drawings, wherein like characters indicate like parts throughout the figures:

FIG. 2 is a top view, rotated 90° in respect to FIG. 1, of the present filter, parts thereof broken away and shown in sections;

FIG. 3 is a view in perspective in retaining mechanism, parts thereof broken away and shown in section; and FIG. 4 is a view in perspective of the permeable filter.

Figure 1:
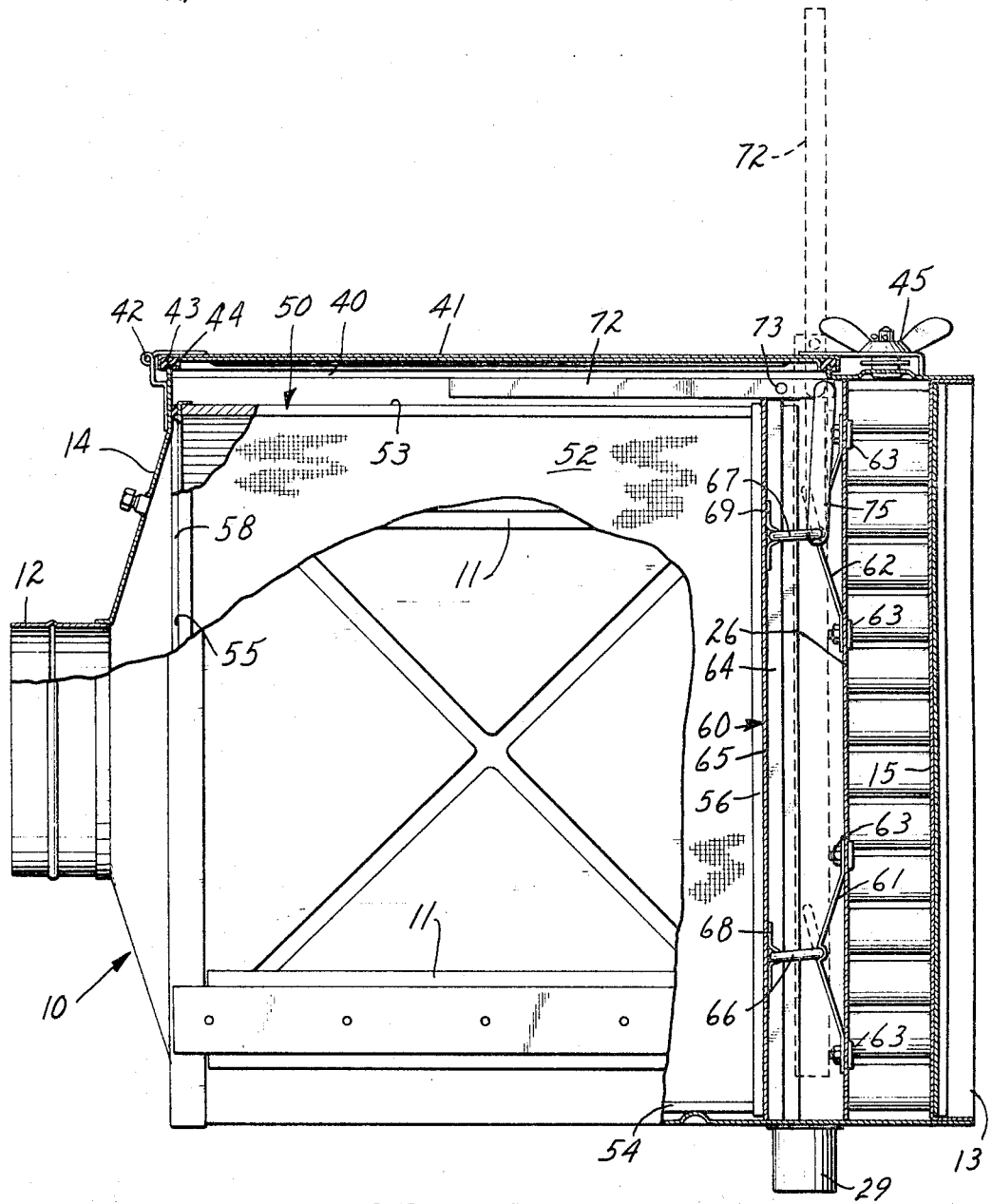
FIG. 1 is a side view of the present filter, parts thereof broken away and shown in section.

The present embodiment is designed to filter air and will be explained in terms of an air filter. However, it should be understood that the filter could be modified slightly to filter other fluids and still come within the scope of this invention.

In the figures the numeral 10 generally designates a substantially rectangular shaped housing having a pair of longitudinally extending mounting means 11 fixedly attached to either side thereof. The left side 14 of the housing 10, in FIG. 1, tapers sharply to a circular outlet 12 through which air is delivered to the device being protected. The right end of the housing 10, as illustrated in FIG. 1 and the bottom as illustrated in FIG. 2, is open and serves as the unifiltered air inlet 13, for the filter. A sheet of material, having two rows of openings on either side thereof extending the height of the housing 10, is fixedly attached in the air inlet 13 of the housing 10 and inset slightly from the end thereof to form a wall 15. The openings in the wall 15 serve as mounting means and inlet ports for four parallel rows of centrifugal filter elements generally designated 17.

The centrifugal filter elements 17 consist essentially of two parts, a hollow cylindrical body 18 and a hollow somewhat conical shaped truncated body 19. The smaller end of the conical body 19 has an outer diameter substantially smaller than the inner diameter of the cylindrical body 18 and is evenly spaced therein by a plurality of small thin fins 20 (but may be spaced by other means) which provide a scavenging flow outlet 21 therebetween. The bottom end 16 of the cylindrical body 18, illustrated in FIG. 2, is adapted to engage an opening in the wall 15 with a snap-in action which holds and seals the cylindrical body 18 fixedly in place. A partition 25 extends across the housing 10 parallel to the wall 15 and spaced therefrom slightly less than the length of the centrifugal filter element 17, except for a recessed central portion 26 thereof which is spaced approximately half the distance from the wall 15. The partition 25 has a plurality of openings therein which match the openings in the wall 15 and are adapted to receive the extreme upper end 27 of the conical body 19 therein. The openings in partition 25 act as mounting means and outlet ports for the conical shaped bodies 19 which are fixedly engaged therein in a snap-in action similar to the end 16 of the conical body 18. When the openings in the wall 15 and partition 25 have opposite ends of the centntrifugal filter elements 17 engaged therein an air tight chamber 28 is formed which serves as a scavenging flow chamber. The lower end of the scavenging flow chamber 28 has an opening 29 therein, illustrated in FIG. 1, through which a scavenging flow is drawn. In some instances more than one opening 29 will be utilized.

The inlet ends 16 of the centrifugal filter elements 17 which protrude slightly through the openings in the wall 15 have a screen 30 fixedly attached thereover for removal of the larger foreign matter in the air entering the filter. A plurality of helical shaped fins 31 are fixedly mounted in the end 16 of the cylindrical body 18 and extend inwardly a sufficient distance to impart a spiral motion to the air entering the centrifugal elements 17. As the air spirals towards the left end of the filter element 17 the dirt and heavy foreign particles are forced outwardly within the cylindrical body 18 and pass out through the scavenging flow outlet 21 with a small amount of air. The main portion of the air passes through the center of the conical shaped body 19 and into a main chamber 35 in the filter.

The housing 10 has an upper end or top 40 with a substantially wedge shaped opening therethrough and a mating cover 41 attached thereto along the front edge by a hinge 42. At the hinge 42 the cover 41 is approximately as wide as the housing 10 and tapers inwardly until it is slightly less than one-half the width of the housing 10. A seal or gasket 43 is fixedly attached to the inner surface of the cover 41 and extends completely around the outer periphery thereof. When the cover 41 is closed the gasket 43 engages a sealing edge 44 of the mating wedge shaped opening in the top 40 of the housing 10. Thus, an opening into the chamber 35 is provided which may be sealed to prevent the flow of air therethrough by the cover 41. The cover 41 is fixedly locked in the closed position by a wing nut locking mechanism 45.

A filter element generally designated 50, illustrated in FIG. 4 rotated 90° with respect to FIG. 1, has a substantially V-shaped cross-section which is slightly smaller in dimensions than the wedge shaped opening at the top of the housing 10. The arms, or sides 51 and 52, of the V-shaped filter element 50 are composed of an air permeable material which is utilized to filter out the fine foreign particles not removed by the centrifugal filter element 17. The top and bottom 53 and 54 respectively and the left and right ends 55 and 56 form a solid frame which hold the permeable material rigidly in place. A handle 57 is attached to the top 53 for the easy insertion and extraction of the filter element 50 in the housing 10. A handle may be provided at either end, since the filter element 50 may be inserted in an end-for-end relationship, for ease in handling of the filter element 50. The left end 55 of the filter element 50 has a large rectangular shaped opening which is completely surrounded by a resilient gasket 58. The gasket 58 is adapted to butt tightly against the left end 14 of the housing 10 around the edges of the portion which slopes steeply toward the circular outlet 12. The purpose of the gasket 58 is to provide a seal between the filter element 50 and the housing 10 so that all air passing into the outlet 12 must pass through the permeable material in the sides 51 or 52 of the filter element 50.

A retaining mechanism generally designated 60 is fixedly mounted in the recessed portion 26 of the partition 25 by means of a pair of V-shaped leaf springs 61 and 62. The leaf springs 61 and 62 are flanged outwardly at the extreme end portions of the arms and the flanges are attached to the portion 26 of the partition 25 by means of bolts 63 or the like. A flat plate 65 is formed with a plurality of longitudinal corrugations or folds therein to provide a broken surface which engages the end 56 of the V-shaped filter 50 in parallel, abutting relationship. The corrugations in the plane 65 are substantially rectangular in cross-section (that is, the folds are all formed by bending the plate 65 at 90° in a plurality of different places) and, in this embodiment, a single groove 64 is formed between two corrugations substantially along the longitudinal center theerof for purposes of mounting the plate 65. The plate 65 is slightly narrower than the recessed portion 26 of the partition 25 so that it can move freely toward and away from the outlet 12. The end 56 of the V-shaped filter 50 is also slightly narrower than the recessed portion 26 so that it can move toward and away from the outlet 12 or in and out of the housing 10 but not in a transverse direction.

A pair of rods are bent into rectangular shaped links 66 and 67 which serve as cam-acting connecting means between the plate 65 and the leaf springs 61 and 62 respectively. One side of each of the links 66 and 67 is rotatably mounted to the apex of the V-shaped leaf springs 61 and 62 respectively by means of a hollow cylindrical bearing formed therein. The opposed sides of the links 66 and 67 are rotatably mounted to the under surface of the plate 65 by means of two pairs of bearing plates 68 and 69 which co-operate with the under surface of the plate 65 to form a cylindrical bearing therebetween. Thus, the plate 65 moves toward and away from the outlet 12 of the housing 10, as well as along the longitudinal axis of the plate 65 with the cam-like rotation of links 66 and 67.

The upper end of the plate 65 has a cut-away portion adjacent either side of the centrally located grooce 64. Sections 70 and 71 of the cut-away portions remain attached to the plate 65 and are bent rearwardly to form two mounting surfaces. A somewhat U-shaped handle 72 is positioned so that a midportion of each of the arms is adjacent the outer surface of the sections 70 and 71. A rod 73 extends through the midportions of the arms of the handle 72, the sections 70 and 71 and the centrally located groove in the plate 65. The ends of the rod 73 protrude outwardly through the arms of the handle 72 and are riveted or otherwise retained, to pivotally mount the handle 72 at the upper end of the plate 65. The extreme ends of the arms of the handle 72 extend rearwardly past the plate 65 and each have a connecting bar 74 and 75, respectively, pivotally attached thereto. The distance between the pivotal mounting of the handle 72 by the rod 73 and the pivotal connections of the bars 74 and 75 is approximately equal to the ditsance between the pivotal mountings on each of the links 66 and 67. The free ends of the connecting bars 74 and 75 have openings therethrough and the side of the link 67 which is pivotally attached to the leaf spring 62 is engaged therein, thereby, pivotally attaching the free ends of the connecting bars 74 and 75 in a substantially fixed position relative to the leaf spring 62.

In the operation of the present filter the handle 72 is pivoted upwardly to a vertical position, illustrated in dotted lines in FIG. 1. As the handle 72 is moved upwardly the connecting bars 74 and 75 remain substantially parallel thereto and fixed in position. The handle 72 pivots about the extreme ends of the arms carrying the rod 73 and the plate 65 upwardly and rearwardly. Once the handle 72 is in the position illustrated in dotted lines the permeable filter element 50 can be inserted through the opening in the top 40 of the housing 10. The filter element 50 has a shape similar to the opening in the top 40 of the housing 10 and therefore can only be inserted in the correct direction. The handle 72 is then pivoted downwardly to the position illustrated in full lines in the figures. As the handle 72 moves downwardly the plate 65 is forced downwardly and is cammed toward the outlet 12 by the links 66 and 67. The downward and forward movement of the plate 65 forces the permeable filter element 50 firmly into position. When the handle 72 is in the horizontal position the links 66 and 67 are slightly overcenter so that the handle is effectively locked in the horizontal position. The leaf springs 61 and 62 take up the excess movement caused by the links 66 and 67 moving past the center position and also maintain a force on the permeable element 50 in spite of slight differences in size thereof. Once the handle 72 is pivoted to its horizontal position the cover 41 is closed and fixed in place by the locking mechanism 45.

When the present filter is connected in a system having the desired amount and direction of air flow the operation is as follows. Air enters the unfiltered air inlet 13 and flows into the inlets 16 of the centrifugal filter elements 17. In the centrifugal filter elements 17 the air is forced into a spiral and the largest portion of the foreign material, generally in the neighborhood of 90 to 95%, flows out through the scavenging flow outlet 21 of each of the centrifugal filter elements 17 to the chamber 23 and passes out of the filter through the scavenging flow outlet 29. The clean air leaves the centrifugal filter elements 17 through the outlets 27 and enters the chamber 35. Because the permeable filter element 50 is constructed with a V-shaped cross-section the centrifugal filter elements 17 are mounted with the outlets 27 beside the permeable sides 51 and 52. Thus, the air flows from the outlet 27 to the chamber 35 and directly through a side 51 or 52 of the permeable filter element 50. After the air has passed through the permeable filter element 50 it passes out through the filtered air outlet 12.

Thus, a filter has been disclosed with a replaceable permeable filter element 50 having a V-shaped cross-section which allows the overall unit to be constructed in a much smaller and compact embodiment. Also, because of the V-shaped cross-section the filter element 50 can be quickly and easily replaced with no danger of inserting the element in a reversed position. In addition to the above, the present filter includes a retaining means 60 which positively positions the permeable filter element 50 in the correct position and provides a force to hold it fixedly in position through the manipulation of a single handle 72.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A fluid filter comprising:
   (a) a housing having an unfiltered fluid inlet at one end, a fluid outlet at the other end and a scavenging flow outlet therebetween;
   (b) a fluid permeable filter element having a generally V-shaped cross-section with the side forming the open end of the V being open to allow the free passage of fluid therethrough and the remaining sides being closed, the tapering sides of the V being constructed of a fluid permeable filter material to allow the passage therethrough of the fluid to be filtered;
   (c) retaining means operatively mounted within said housing for engaging the apex of said V-shaped filter element and maintaining the open side thereof in fluid-tight engagement with portions of said housing adjacent and about said filtered fluid outlet;
   (d) a plurality of centrifugal tubular filter elements each having an unfiltered fluid inlet, a filtered fluid outlet and a scavenging flow outlet;
   (e) first and second spaced apart partitions within said housing forming a scavenging fluid chamber therebetween with which said scavenging flow outlet of said housing is connected, said first partition extending across the unfiltered fluid inlet of said housing and said second partition partially encircling said retaining means and the apex of said filter element and forming a wall extending outwardly from each of the tapering sides of said filter element towards the opposite side walls of the housing between the apex and the open end thereof; and
   (f) a plurality of openings through each of said walls and corresponding plurality of substantially axially aligned openings through said first partition forming pairs of openings each having a centrifugal filter element mounted therein with the unfiltered fluid inlets affixed in the openings through said first partition, the filtered fluid outlets affixed in the openings through said walls, and the scavenging flow outlets opening into said scavenging fluid chamber.

2. A fluid filter substantially as set forth in claim 1 wherein the housing has a wedge shaped opening therein intermediate the fluid outlet and the scavenging flow outlet of the housing compatible with the size of the V-shaped cross-section filter element for insertion and removal of said V-shaped cross-section filter element.

3. A fluid filter substantially as set forth in claim 1 wherein the retaining means includes a surface adapted to receive the apex of the V-shaped cross-section filter element in abutting engagement therewith movably attached within the housing by cam-acting mounting means for movement toward and away from the filtered fluid outlet in said housing and a handle attached to said surface and to a pivotal point which is substantially fixed relative to said housing for pivotal movement of said handle about said pivotal point with resulting movement of said surface toward and away from the filtered fluid outlet.

4. A fluid filter substantially as set forth in claim 3 wherein the cam-acting mounting means includes cam-acting members and spring means attached to said cam-acting members and the inner surface of the housing for absorbing differences in size of the V-shaped cross-section filter element and allowing said cam-acting members to move slightly over center whereby the handle is locked in an operating position.

References Cited

UNITED STATES PATENTS

| | | | |
|---|---|---|---|
| 272,582 | 2/1883 | Provonchar | 55—357 |
| 2,016,033 | 10/1935 | Christofferson | 55—357 |
| 2,453,206 | 11/1948 | Donat | 55—357 |
| 2,662,610 | 12/1953 | Heinrich | 55—347 |
| 2,907,406 | 10/1959 | Baden et al. | 55—341 |
| 3,023,447 | 3/1962 | Senne | 55—378 |

FOREIGN PATENTS

| | | |
|---|---|---|
| 896,609 | 5/1944 | France. |
| 1,320,200 | 1/1963 | France. |
| 1,094,206 | 12/1960 | Germany. |

HARRY B. THORNTON, *Primary Examiner.*

B. NOZICK, *Assistant Examiner.*